May 2, 1939.  B. B. SMITH  2,156,795
DETACHABLE REFRIGERATED CUTTING BLOCK APPARATUS
Filed June 14, 1937
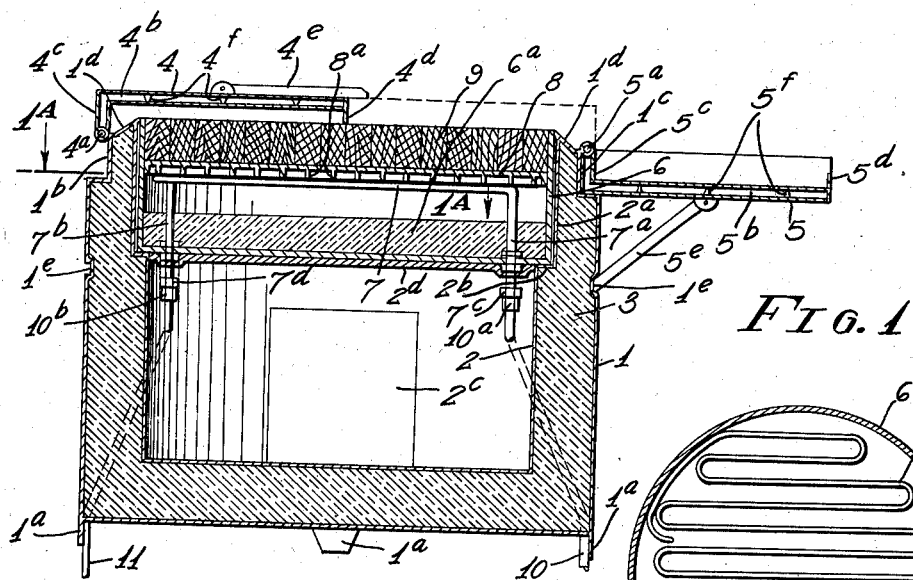
INVENTOR.
Beauford B. Smith
By A. B. Bowman
ATTORNEY.

Patented May 2, 1939

2,156,795

UNITED STATES PATENT OFFICE 2,156,795

DETACHABLE REFRIGERATED CUTTING BLOCK APPARATUS

Beauford B. Smith, San Diego, Calif.

Application June 14, 1937, Serial No. 148,122

12 Claims. (Cl. 62—11)

My invention relates to a refrigerated cutting block used for preparing food in retail food establishments, small concerns, and for domestic use, and the objects of my invention are:

First, to provide a meat or cutting block in which the cutting surface is chilled by refrigeration and the unit including the cutting surface is readily removable for treatment in various ways;

Second, to provide an apparatus of this class with a casing for holding the block surface and refrigerating coils in a single unit which may be readily removed;

Third, to provide a block of this class with means for keeping the upper surface covered and for supporting the covers in position for holding material when the surface is open ready for use;

Fourth, to provide an apparatus of this class with a compartment that may be used for storage or an air conditioning unit;

Fifth, to provide a structure of this class in which the blocks and refrigerating coil are supported in contiguous unitary relation to each other;

Sixth, to provide an apparatus of this class in which the cutting block and refrigerating unit are so positioned in the main portion of the block that it may be readily removed and still forms a tight fit with the casing in which it is mounted;

Seventh, to provide an apparatus of this class which is very simple and economical of construction, easy to operate, efficient in its action and which will not readily deteriorate or get out of order.

With these and other objects in view as will appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a sectional view of my detachable refrigerated cutting block apparatus showing the cover in closed relation over the block surface at one side and open at the opposite side and taken along the line 1—1 of Fig. 2 showing some of the parts in elevation to facilitate the illustration; Fig. 1A is a reduced fragmentary sectional view from the line 1a of Fig. 1; Fig. 2 is a top or plan view of my detachable refrigerated cutting block apparatus with one of the covers closed and the other open and Fig. 3 is a side elevational view of the detachable cutting block and refrigerated unit shown when removed from the rest of the apparatus.

Similar characters of reference refer to similar parts and portions throughout the several views of the drawing.

The outer casing 1, inner casing 2, insulation 3, cover members 4 and 5, detachable casing 6, refrigerating coil 7, cutting surface block support 8, and cutting surface blocks 9 constitute the principal parts and portions of my detachable refrigerated cutting block apparatus.

The outer casing 1 is preferably circular in form and provided with downwardly extending lug portions 1a upon which the apparatus rests. It is provided near its upper side with straight portions 1b and 1c to the upper edges of which are hinged the cover members 4 and 5 respectively by means of hinges 4a and 5a. These cover members are made double providing air spaces 4b and 5b for insulation of the cover members, and the walls are separated by spaced lugs 4f and 5f, and it is preferred to make the inside of these cover members of light stainless alloy. The hinge side of the cover members is offset at 4c and 5c so that when the cover members are closed they are spaced from the upper surface of the cutting block as shown best in Fig. 1 of the drawing, the inner edges being provided with downwardly extending ledges 4d and 5d which rest upon the block at the middle when closed. These cover members are provided on their upper surfaces when closed with brace members 4e and 5e which serve as supports for the cover when in their open position, the ends of said braces extending into notches 1e in the opposite sides of the outer casing 1. This outer casing is provided with an upwardly and inwardly extending portion 1d which extends from the hinge portion 5a and also from the upper edge of the member 1 and extends inwardly against the upper side of the casing 6 providing a fit between the upper edge of the casing 6 and the upper edge of the member 1. Connecting with the lower inner side of the portion 1d is the inner casing 2. This inner casing 2 is provided with an enlarged portion 2a providing a shoulder 2b on which rests detachable casing 6. Then this inner casing 2 is reduced and forms a storage chamber provided with a door 2c in one side to provide access to the interior for loosening and removing the detachable casing 6 as well as an entrance and exit for storage goods. The space between the casings 1 and 2 is filled with suitable insulation material 3. Mounted in the casing 6 spaced from the upper edge thereof is the cutting surface block support 8 which is secured to the interior surface of the casing 6 and forms a partition in horizontal position therein. The support is flat on its upper surface and is adapted to support the cutting surface blocks 9 which are preferably of moisture impregnated wood and formed with smooth upper surface in close relation to each other as shown best in Figs. 1 and 2 of the drawing. The upper surface of the blocks 9 are substantially flush with the upper surface of the portion 1d and the upper edge of the casing 6 all as shown best in Fig. 1 of the drawing. The lower side of the support 8 is provided with a plurality of reinforcing ribs 8a and resting against the lower side of these ribs 8a is the refrigerating coil 7, thus conducting the refrigeration into the ribs through the support 8 and blocks 9. This coil connects at one end with a drop conductor 7a and at its opposite end with a drop conductor 7b both of which extend downwardly through the bottom of the casing 6 at opposite sides and are supported by means of nuts on the opposite sides of said partition. These drop conductors extend further downwardly and are provided with coupling nuts 7c and 7d which are adapted to receive coupling members 10a and 10b which connect with conductors 10 and 11 which conductors 10 and 11 connect with a refrigerating machine (not shown) thus forming a circuit by means of the conductors 10, 7a, and 7b and coils 7.

In order to utilize the storage or air conditioning portion when the cutting block unit is removed, there is provided a partition 2d immediately below the casing 6 and closing the upper side of this storage compartment to conserve the cold air therein. Also, to provide greater refrigeration of the blocks 9 from the coils 7, there is provided insulation 6a which seals to a large extent the coil 7 and causes refrigeration to be forced upwardly into the blocks 9.

The operation of my apparatus is as follows: when the apparatus is not in use, the cover members 4 and 5 are closed and refrigeration from the refrigerating machine passes through the conductors 10 and 7a and coil 7 and out through conductors 7b and 11 in continuous circuit chilling the coil 7, thus chilling the support 8 and the blocks 9, thus providing a chilled surface block. If it is desired to use the whole of the upper surface of the block, the covers 4 and 5 may be tilted back and placed as shown by the open cover in Figs. 1 and 2 of the drawing, and these covers may be used as receptacles for holding goods if desired. However, one of the cover members may be closed and the other one open for using only a portion of the cutting block. Goods for the refrigeration may also be placed in the casing 2 below the casing 6 through the door 2c for cold storage. If it is desired to refinish the block surface, clean it, or otherwise treat it, it may be readily removed by loosening the couplings 10a and 10b and then the casing 6 may be lifted out as shown in its detached relation in Fig. 3 of the drawing.

It will be here noted that in case the moisture is evaporated to any large extent because of the freezing of the blocks 9, the moisture may be restored to the blocks either by absorption or by some hydraulic means.

Though I have shown and described a particular construction, combination, and arrangement of parts and portions, I do not wish to be limited to this particular construction, combination, and arrangement, but desire to include in the scope of my invention, the construction, combination, and arrangement substantially as set forth in the appended claims.

Having thus described my invention, what I claim as new and desire to secure by Letters Patent is:

1. In a detachable refrigeration cutting block apparatus, a unitary insulated box member open at its upper end, an encased refrigerating coil, cutting surface block support, and blocks, readily detachably supported in the upper end thereof.

2. In a detachable refrigeration cutting block apparatus, a unitary insulated box member open at its upper end, an encased refrigerating coil, cutting surface block support, and blocks, readily detachably supported in the upper end thereof, and a pair of opposed cover members positioned on the outer side of said casing foldable over the upper side of said cutting blocks in spaced relation therewith.

3. In a detachable refrigeration cutting block apparatus, a unitary insulated box member open at its upper end, an encased refrigerating coil, cutting surface block support, and blocks readily detachably supported in the upper end thereof, a pair of opposed cover members positioned on the outer side of said casing foldable over the upper side of said cutting blocks in spaced relation therewith, and each of said cover members being provided with a brace support for engagement with said casing and supporting said covers in open extended position.

4. In a detachable refrigeration cutting block apparatus, a hollow insulated box member having a relatively small diameter at its lower side and relatively large diameter at its upper side providing a shoulder in the wall thereof and open at its upper side.

5. In a detachable refrigeration cutting block apparatus, a hollow insulated box member having a relatively small diameter at its lower side and relatively large diameter at its upper side providing a shoulder in the wall thereof and open at its upper side, and a readily detachable refrigerating unit and block surface mounted in the larger portion of said cylinder and supported on said shoulder.

6. In a detachable refrigeration cutting block apparatus, a hollow insulated box member having a relatively small diameter at its lower side and relatively large diameter at its upper side providing a shoulder in the wall thereof and open at its upper side, a readily detachable refrigerating unit and block surface mounted in the larger portion of said cylinder and supported on said shoulder, and a horizontal partition interposed between the cutting block and said refrigeration coil.

7. In a detachable refrigeration cutting block apparatus, a hollow insulated box member having a relatively small diameter at its lower side and relatively large diameter at its upper side providing a shoulder in the wall thereof and open at its upper side, a readily detachable refrigerating unit and block surface mounted in the larger portion of said cylinder and supported on said shoulder, a horizontal partition interposed between the cutting block and said refrigeration coil, and air insulated cover members on opposite sides of said insulated box member and adapted to hinge over the upper surface of said box in surfaced relation therewith or extend outwardly below the upper surface of said blocks in opposite directions.

8. In an apparatus of the class described, a readily detachable refrigeration cutting block, including a casing, a supporting partition positioned horizontally therein intermediate its upper and lower sides, cutting blocks filling the casing above said partition, and a refrigerating coil adjacent the lower side of said partition.

9. In an apparatus of the class described, a readily detachable refrigeration cutting block, including a casing, a supporting partition positioned horizontally therein intermediate its upper and lower sides, cutting blocks filling the casing above said partition, a refrigerating coil adjacent the lower side of said partition, and cooling medium conductors readily detachably connected with said coil outwardly of said casing.

10. In an apparatus of the class described, a readily detachable refrigeration cutting block, including a casing, a supporting partition positioned horizontally therein intermediate its upper and lower sides, cutting blocks filling the casing above said partition, a refrigerating coil adjacent the lower side of said partition, cooling medium conductors readily detachably connected with said coil outwardly of said casing, and an insulated casing with an enlarged open end adapted to receive said detachable casing and support the upper sides of said cutting blocks in horizontal position above said insulated casing.

11. In an apparatus of the class described, a readily detachable refrigeration cutting block, including a casing, a supporting partition positioned horizontally therein intermediate its upper and lower sides, cutting blocks filling the casing above said partition, a refrigerating coil adjacent the lower side of said partition, cooling medium conductors readily detachably connected with said coil outwardly of said casing, an insulated casing with an enlarged open end adapted to receive said detachable casing and support the upper sides of said cutting blocks in horizontal position above said insulated casing, and combined cover members and receptacles pivotally connected to the side walls of said insulated casing near the upper side adapted to cover said blocks when in closed position and forming receiving receptacles when in open position.

12. In an apparatus of the class described, a readily detachable refrigeration cutting block, including a casing, a supporting partition positioned horizontally therein intermediate its upper and lower sides, cutting blocks filling the casing above said partition, a refrigerating coil adjacent the lower side of said partition, cooling medium conductors readily detachably connected with said coil outwardly of said casing, an insulated casing with an enlarged open end adapted to receive said detachable casing and support the upper sides of said cutting blocks in horizontal position above said insulated casing, combined cover members and receptacles pivotally connected to the side walls of said insulated casing near the upper side adapted to cover said blocks when in closed position and forming receiving receptacles when in open position, and said insulated casing provided with a storage compartment in its lower side below said detachable casing.

BEAUFORD B. SMITH.